2,975,168
PROCESS OF PREPARATION OF A TRI-(HYDROXY-ETHYL) ETHER OF RUTIN

Jacques Favre, Nyon, Switzerland, assignor to Zyma S.A., Nyon, Switzerland, a corporation of Switzerland No Drawing. Filed June 27, 1958, Ser. No. 744,920

Claims priority, application Switzerland July 4, 1957

9 Claims. (Cl. 260—210)

The methylation of a molecule of hesperidine with four molecules of dimethyl sulphate in the presence of four molecules of caustic soda or another alkaline inorganic hydroxide is known to lead to the formation of hesperidine methyl chalcone by rearrangement in positions 1, 2 of the nuclear oxygen of hesperidine. The hesperidine-methyl-chalcone is very soluble in water and may be precipitated from its aqueous solution by sodium chloride. This methyl chalcone gives with concentrated sulphuric acid a strong red coloration.

Rutin which possesses a double-bond in the 2,3 position does not give a chalcone under the same conditions.

It has now been found that if a molecule of rutin is heated with 1, 2 and 3 molecules of ethylene chlorohydrin, respectively, in the presence of a corresponding quantity of alkali, e.g. caustic soda, there are obtained a mono-, di- and tri-(hydroxyethyl) ether of rutin.

These three ethers may be differentiated by their solubilities and melting points, their melting points being respectively, 260°, 204° and 156° C.

Based on this discovery it is an object of the present invention to provide a process for the preparation of a tri-hydroxyethyl ether of rutin.

There is provided by the present invention a method of producing a tri-(hydroxyethyl) ether of rutin which comprises reacting rutin at an elevated temperature with at least three molecular proportions of ethylene chlorohydrin in the presence of at least three molecular proportions of an alkali.

There is also provided by the present invention a tri-(hydroxyethyl) ether of rutin obtainable by reacting rutin at an elevated temperature with at least three molecular proportions of ethylene chlorohydrin in the presence of at least three molecular proportions of an alkali, and being a hygroscopic organic solid having a melting point of 156° C. when anhydrous, soluble in water, methanol, glycerine and propylene glycol and insoluble in ether, benzene and chloroform.

The preferred alkali is sodium hydroxide and the reaction is preferably carried out under an atmosphere of nitrogen. The rutin may be reacted in a suspension in water and the preferred elevated temperature is from 55 to 90° C. more advantageously 55 to 75° C.

In an embodiment of the present invention rutin in a suspension in water and in the presence of an alkali is reacted with ethylene chlorohydrin at a temperature of from 55 to 75° C. and the aqueous solution containing the reaction products subsequently acidified, the reaction and the acidification step being effected under an atmosphere of nitrogen.

When rutin is reacted in a suspension in water, the final reaction mixture may be subjected to evaporation under a vacuum to remove substantially all the water therefrom and the residue thereby produced treated with boiling methanol and the tri-(hydroxyethyl) ether of rutin precipitated from the methanol solution so formed, by evaporation and cooling thereof, or by evaporation and the addition thereto of absolute ethanol.

It is entirely non-toxic and can be injected without the slightest inconvenience. From the pharmacological point of view it exhibits all the characteristics of a bioflavonoid (P factor) in addition to a high degree of solubility. Its solution is sterilisable at 120° C. Moreover, it has applications in dietetics.

An illustrative example of the manner in which the method proposed by the invention can in practice be performed will be hereinafter described:

In a nitrogen atmosphere 120 g. of caustic soda (3 mols) in solution are added to 610 g. of rutin (1 mol) suspended in 2 litres of water, the mixture being vigorously agitated by a mechanical stirrer, 241.5 g. of chlorohydrin being then introduced at 55° in the course of 10 minutes. When all the chlorohydrin has been thus added the temperature is progressively raised to 75° and maintained at this level for 2 hours. After cooling, still in a nitrogen atmosphere, the pH-value is adjusted to 5 by the addition of dilute hydrochloric acid. The solution is kept in an ice box for 24 hours and then filtered to remove any impurities. At reduced pressure the solution is evaporated until dry, the residue is taken up in 3 litres of boiling methanol which dissolves the trioxyethyl rutin formed and leaves the little soluble sodium chloride behind.

The tri-(hydroxyethyl) ether of rutin recovered from its methanolic solution either by evaporation and refrigeration, or by evaporation and precipitation with absolute ethanol. In either case the tri-(hydroxyethyl) ether of rutin obtained is in the form of small very hygroscopic crystals which contain alcohol of crystallisation.

These crystals are quickly shaken and washed in a little cold absolute ethanol and then dried in vacuo at 100° C.

680 g. of anhydrous trioxyethyl rutin are thus obtained in the form of a clear yellow powder which melts at 156° C.

This powder is extremely soluble in water, methanol, glycerine and propylene glycol. It is little soluble in warm and practically insoluble in cold ethanol. In ethanol it crystallises in the form of small yellow very hygroscopic crystals containing ethanol, and it is insoluble in ether, benzene and chloroform.

What I claim is:
1. A method of producing a tri-(hydroxyethyl) ether of rutin which comprises reacting rutin at an elevated temperature with at least three molecular proportions of ethylene chlorohydrin in the presence of at least three molecular proportions of an alkali.
2. A method according to claim 1, wherein said alkali is sodium hydroxide.
3. A method according to claim 1, wherein the reaction is effected under an atmosphere of nitrogen.
4. A method according to claim 1 wherein said elevated temperature is from 55° to 90° C.
5. A method according to claim 4, wherein the said elevated temperature is from 55° to 75° C.
6. A method according to claim 1, wherein said rutin is reacted in a suspension in water.
7. A method of producing a tri-(hydroxyethyl) ether of rutin which comprises the steps of reacting rutin in a suspension in water and in the presence of at least three molecular proportions of an alkali with at least three molecular proportions of ethylene chlorohydrin at a temperature of from 55° to 75° C., and subsequent acidification of the aqueous solution containing the reaction products, which steps are effected under an atmosphere of nitrogen.
8. A method according to claim 6, wherein substantially all the water is evaporated under vacuum from the final reaction mixture, the residue thereby produced treated with boiling methanol and the tri-(hydroxyethyl) ether of rutin precipitated from the methanol solution so formed, by evaporation and cooling thereof, or by the evaporation and the addition thereto of absolute ethanol.

9. Tri-(hydroxyethyl) ether of rutin; a hygroscopic solid having a melting point of 156° C. when anhydrous; soluble in water, methanol, glycerine and propylene glycol; and insoluble in ether, benzene and chloroform.

References Cited in the file of this patent

Muschaweck-Arch. Exptl. Path. Pharmakol 209 (1950), pages 279–285.

Chem. Abst. 44 (1950), 8519 g.